United States Patent
Döhring et al.

(10) Patent No.: US 6,312,011 B1
(45) Date of Patent: Nov. 6, 2001

(54) STEERING WHEEL HAVING A STEERING WHEEL HOLLOW

(75) Inventors: Klaus Döhring, Aschaffenburg; Veit Kaufmann, Mannheim, both of (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/176,383

(22) Filed: Oct. 21, 1998

(30) Foreign Application Priority Data

Oct. 29, 1997 (DE) .............................................. 197 47 665

(51) Int. Cl.⁷ .................................................... B60R 21/16
(52) U.S. Cl. ........................... 280/731; 280/777; 280/750
(58) Field of Search ................... 280/728.2, 731, 280/732, 777, 750; 74/552; 188/371

(56) References Cited

U.S. PATENT DOCUMENTS

| Re. 36,351 | * | 10/1999 | Yamamoto et al. | 280/728.2 |
| 4,943,027 | | 7/1990 | Nakayama | 248/548 |
| 4,946,194 | | 8/1990 | Maeda et al. | 280/777 |
| 5,590,900 | * | 1/1997 | Duran et al. | 280/728.2 |
| 5,730,459 | * | 3/1998 | Kanda | 280/731 |
| 5,813,692 | * | 9/1998 | Faigle et al. | 280/728.2 |
| 5,871,234 | * | 2/1999 | Umemura et al. | 280/777 |
| 5,931,492 | * | 9/1999 | Mueller | 280/728.2 |
| 6,095,549 | * | 8/2000 | Adomeit et al. | 280/728.2 |
| 6,120,057 | * | 9/2000 | Adomeit et al. | 280/731 |

FOREIGN PATENT DOCUMENTS

| 196 45 373 A1 | * | 4/1998 | (DE) | B60R/21/16 |

* cited by examiner

*Primary Examiner*—J. J. Swann
*Assistant Examiner*—J. Allen Shriver
(74) *Attorney, Agent, or Firm*—Martin A. Farber

(57) ABSTRACT

A steering wheel is fastened on a steering column by a steering wheel hollow (1). Within this steering wheel hollow (1), an airbag (15) is fastened on a plate (11) which in the rest position bears against the base (2) of the steering wheel hollow (1) and, as the airbag (15) inflates, the plate is displaced within the steering wheel hollow (1) away from the base (2). The steering wheel has travel limitation members (screw 12) for the maximum possible travel of the plate (11). Release of the airbag (15) produces a free space (16) between the plate (11) and the base (2) of the steering wheel hollow (1), which free space is formed so as to receive end regions of spokes (4, 5), which end regions are remote from a steering wheel rim (6).

16 Claims, 2 Drawing Sheets

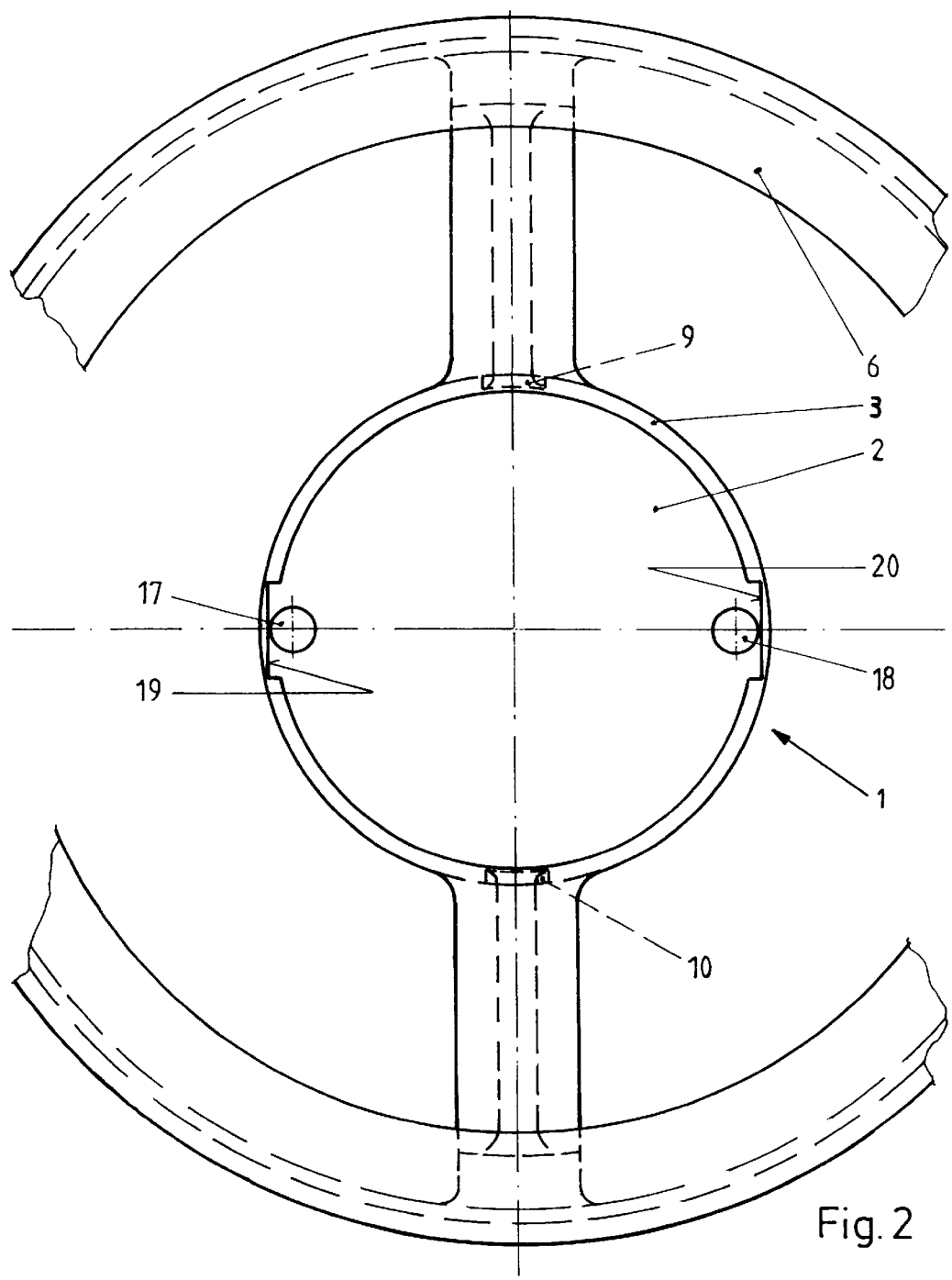
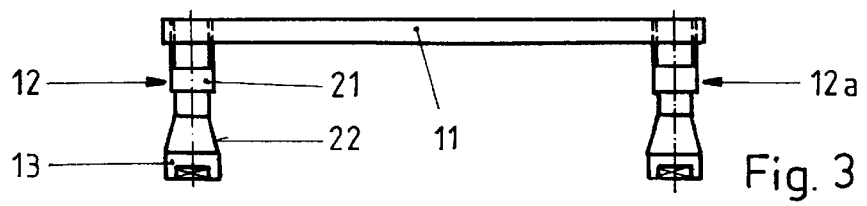
Fig. 2
Fig. 3

STEERING WHEEL HAVING A STEERING WHEEL HOLLOW

FIELD AND BACKGROUND OF THE INVENTION

The invention relates to a steering wheel having a steering wheel hollow which is fastened by its base to a steering column and in which an airbag, which inflates in the event of a vehicle impact, is accommodated and from its casing spokes lead to a steering wheel rim which, with respect to the steering wheel hollow, is offset axially toward the vehicle interior.

Steering wheels of this type are widely used in today's motor vehicles and are therefore generally known. In the event of an impact accident, the airbag, which is arranged in the steering wheel hollow, is intended to be completely inflated if the driver is flung in the direction of the steering wheel, in order to prevent a hard impact against the steering wheel. Cases may, however, arise in which this protective action of the airbag does not occur. For example, this is the case if in an accident there is an initial impact against a first obstacle and then against a further obstacle which finally brings the vehicle to rest. In such a case, the airbag is inflated in the first impact and may already be discharged again by the second impact. Another occurrence which is most unfavorable for the driver is if he sits too close to the steering wheel and impacts against the airbag which is still inflating and at this time is undesirably hard and initially unyielding. It is therefore desirable for the steering wheel to be deformable in the axial direction in order, independently of the airbag, to be able to yield in the axial direction in the event of the driver impacting against the steering wheel.

It is also already known to connect a vehicle steering to a cable mechanism in such a manner that in the event of a frontal impact, the entire steering wheel is displaced in the direction of the dash-board. This reduces the risk of the driver becoming wedged, but mechanisms of this type are very costly and complex and have therefore not been able to be generally used so far.

SUMMARY OF THE INVENTION

An object of the invention is to provide a steering wheel having an airbag in its steering wheel hollow in such a manner that the steering wheel can be deformed in the axial direction.

According to the invention, the airbag is fastened on a plate which in the rest position bears against the base of the steering wheel hollow and, as the airbag inflates, is displaced within the steering wheel hollow away from the base, the steering wheel having at least one travel limiting means for the maximum possible travel of the plate, and with the airbag released, the space between the plate and the base of the steering wheel hollow being formed to receive end regions of the spokes, which end regions are remote from the steering wheel rim, and/or regions of the casing of the steering wheel hollow.

This formation of the steering wheel produces a free space in the steering wheel hollow after the airbag has been released. As a result, in the event of the driver impacting on the steering wheel rim and/or on the inflated airbag, the steering wheel rim can buckle forward by the ends of the spokes moving into this free space in the steering wheel hollow. The invention thus provides a steering wheel which is able, because of its axial deformability, to mitigate the consequences of an impact independently of the airbag. Furthermore, this deformability in the event of an accident increases the free space for the driver thereby reducing the risk of the driver becoming wedged behind the steering wheel. The inventive formation of the steering wheel can be implemented substantially more cost-effectively than the measures disclosed previously to withdraw the steering wheel in the event of a frontal impact and thus the passive safety of motor vehicles can be increased with relatively little outlay.

According to the invention, a sufficiently large, free space is produced between the base of the steering wheel hollow and the plate after the airbag has been released, into which space the spokes can move. It must, however, be reliably ensured that the airbag cannot be detached from the steering wheel in the event of an accident. These two requirements can be fulfilled in a very simple manner if, in accordance with a development of the invention, the travel limiting means is formed by a bolt which is fastened to the plate, penetrates through a recess in the base and on that side of the base which is remote from the plate, with the plate bearing against the base, has, at a distance from the base, a head which does not fit through the particular recess.

As the plate moves away from the base of the steering wheel hollow after the airbag has been released, it is not braked abruptly, which could result in components being destroyed and thereby in the plate coming free, if, in accordance with a particularly advantageous feature of the invention, the head of the bolt is expanded from its shank with a cross-sectionally conical surface. In such an embodiment, the conical surface is able to slightly widen the recess before the head of the bolt prevents further axial travel. Braking is therefore brought about over a distance defined by the conical surfaces, rather than sudden stopping.

For simple production and easy assembly of the steering wheel, it is of particular advantage if the bolt is a screw which is screwed into the plate.

According to an advantageous feature of the invention, the steering wheel has two travel limiting means. These enable the forces which occur as the airbag is inflating to be particularly readily and uniformly absorbed by the base of the steering wheel hollow.

Wedging of the bolts in the holes, and hence obstruction of the axial travel of the plate as the airbag is being released, can be ruled out in a simple manner by the plate being guided in the hollow by means of a rotation-preventing means, and the bolts in the recesses in the base of the steering wheel hollow have a clearance which cannot be eliminated by the maximum possible rotation of the plate.

The spokes and the steering wheel hollow can differ very widely in design in order to achieve the ability of the spoke ends buckling into the steering wheel hollow. It would be possible, for example, to design the casing surface of the steering wheel hollow such that it can be deformed to the extent that in the event of an accident, the spokes together with the corresponding regions of the steering wheel hollow move into the space behind the plate and in front of the base of the steering wheel hollow. The steering wheel is formed in a particularly simple manner if the spokes, on their side which faces the steering column, each have a web which is directed toward the side of the steering column and leads right against the outer casing surface of the steering wheel hollow, and in the region of each spoke, the casing of the steering wheel hollow is provided with a respective predetermined breaking region. As a result, in the event of a crash the ends of the spokes pivot into the steering wheel hollow.

During normal operation of the motor vehicle, steering wheels are often stressed by high forces. In many cases, steering wheels are of such stable design that the driver is able to support his full weight on the steering wheel without causing it to be deformed. Even in the case of a steering wheel having predetermined breaking points, this high degree of strength can be provided if the webs extend in the axial direction of the steering wheel hollow until they overlap the plate which is arranged in the steering wheel hollow and is in the rest position. By means of this development, the plate prevents the spokes from collapsing into the steering wheel hollow in the rest position by supporting the regions behind the predetermined breaking points. In the event of an accident, this support disappears as the plate moves in the direction of the driver, with the result that the predetermined breaking points can then break, even when forces are relatively low, and the desired axial displaceability of the steering wheel occurs.

BRIEF DESCRIPTION OF THE DRAWINGS

With the above and other objects in view, the present invention will become more clearly understood in connection with the detailed description of a preferred embodiment, when considered with the accompanying drawings of which:

FIG. 2 shows a plan view of the steering wheel; and

FIG. 3 shows a side view of a plate of the steering wheel.

BRIEF DESCRIPTION OF THE PREFERRED EMBODIMENT

Figure 1:
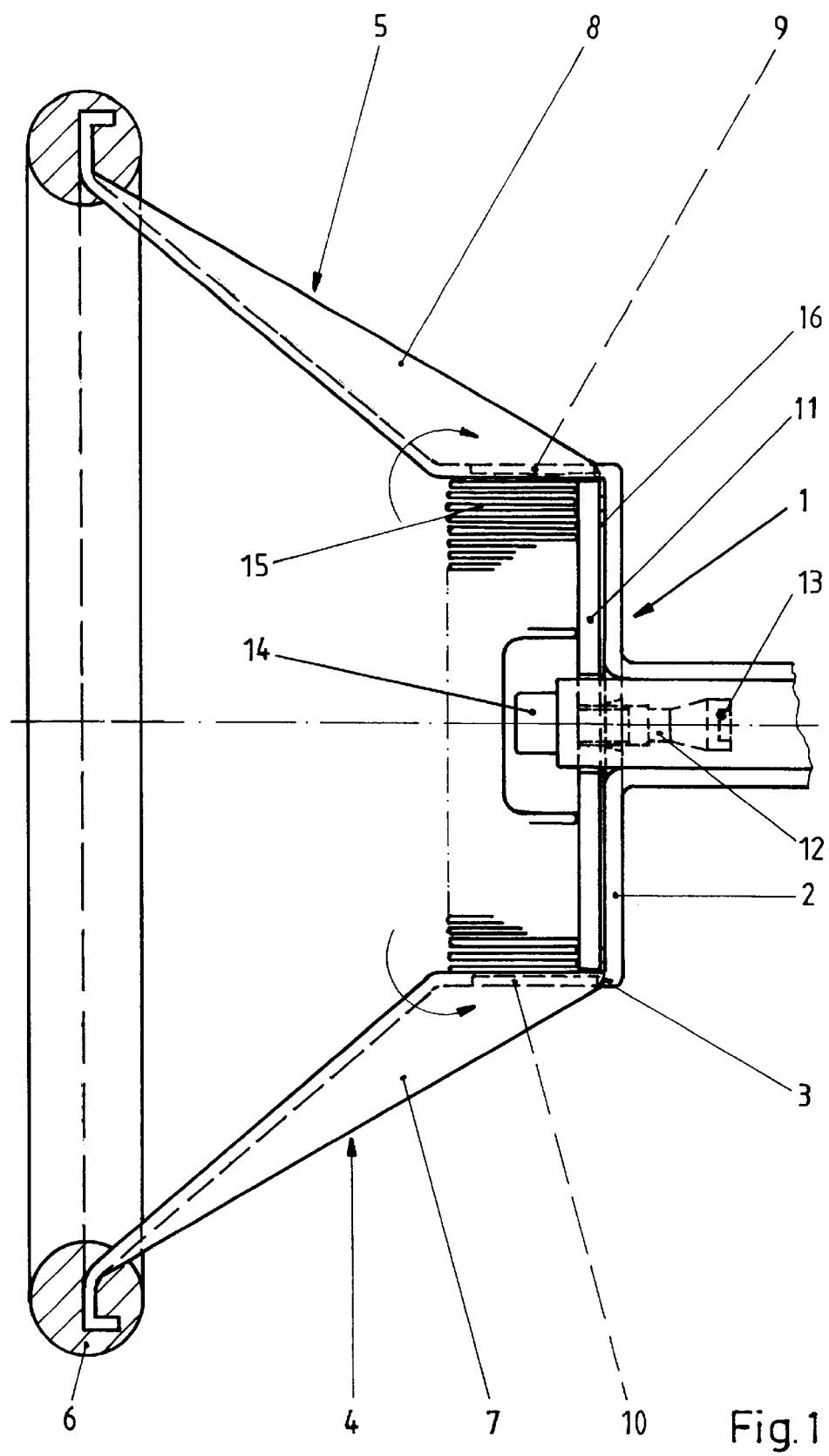
FIG. 1 shows a longitudinal section through a steering wheel according to the invention.

FIG. 1 shows a steering wheel hollow 1 which can be fastened to a steering column (not shown) and which has a base 2 and a casing 3. From the casing 3 spokes 4, 5 lead to a steering wheel rim 6. These spokes 4, 5, on the side which is remote from the driver, each have a web 7, 8 which is connected to the casing 3. In the region of this connection the casing 3 has a respective predetermined breaking region 9, 10 which is produced by a recess.

A plate 11 bears in the interior of the steering wheel hollow 1 against the base 2 thereof, to which plate are fastened screws 12 which penetrate through the base 2 and have heads 13. These heads 13 limit, in a manner which is yet to be explained, the maximum movement of the plate 11 away from the base and to the left, as seen in FIG. 1.

A gas generator 14 is arranged on the plate 11, which gas generator ignites in the event of a frontal impact of a vehicle having the steering wheel shown, and inflates an airbag 15 likewise fastened on the plate 11. Once this has happened, the plate 11 then moves to the left in the steering wheel hollow 1 until the heads 13 of the screws 12 limit this travel. This produces a free space 16 between the plate 11 and the base 2, into which free space the ends of the webs 7, 8 can pivot after the predetermined breaking regions 9, 10 have broken through in the direction of arrows drawn in FIG. 1.

FIG. 2 reveals that the steering wheel hollow (hub) 1 has, in its base 2, recesses 17, 18 through which, from the rear side, the screws 12 which are shown in FIG. 1 and are screwed into the plate 11 are guided. FIG. 2 furthermore shows that the steering wheel hollow (hub) 1 has, on the inside, two radially aligned recesses 19, 20 into which the plate 11 is able to engage, with the result that a rotation-preventing means is produced. The predetermined breaking regions 9, 10 (shown in FIG. 1) in the casing 3 can likewise be seen in FIG. 2.

FIG. 3 shows the plate 11 with the two screws 12, 12a screwed into it. Each of the screws has a shank 21 and a conical surface 22 widening toward the head 13. The head 13 and the shank 21 are dimensioned such that, when the plate 11 is displaced in the steering wheel hollow 1, the screws 12, 12a do not initially obstruct this displacement but then, toward the end of the displacement travel, make contact with the conical surface 22 against the wall of the respective recess 17, 18 and thereby, by widening the recess 17, 18, brake and limit the displacement travel.

What is claimed is:

1. A steering wheel for a vehicle adapted to be connected to a steering column, said steering wheel comprising:

a steering wheel hollow having a casing and a base, said base being adapted to be connected to said steering column;

an airbag disposed in said steering wheel hollow, said airbag inflating in event of a vehicle impact;

a steering wheel rim, with respect to the steering wheel hollow, being offset axially toward a position of a driver;

spokes connected between said casing and said steering wheel rim, said spokes having end regions remote from said steering wheel rim;

a plate displaceably disposed in said steering wheel hollow;

wherein the airbag is fastened on said plate, said plate in a rest position being substantially against the base of the steering wheel hollow and, as the airbag inflates, said plate is displaced within said steering wheel hollow away from said base defining a space between said plate and said base;

wherein said steering wheel has at least one travel limiting member limiting maximum displacement of said plate away from said base; and wherein with the airbag inflated in a released position, when a sufficient load occurs on said spokes, said end regions of spokes and end regions of the casing of the steering wheel hollow break off from said casing such that said broken off end regions of said spokes enter said space between the plate and the base of the steering wheel hollow, whereby the steering wheel is easily axially collapsable.

2. The steering wheel according to claim 1, wherein said base has a recess, said travel limiting member is formed as a bolt which is fastened to said plate and penetrates through said recess in the base; and on a side of the base which is remote from the plate, in said rest position with the plate bearing against the base, said bolt has, at a distance from the base, a head, which upon inflation of said airbag and said displacement of said plate, does not fit through said recess in the base.

3. The steering wheel according to claim 2, wherein the bolt has a shank and a conical surface widening from said shank towards the head of the bolt.

4. The steering wheel according to claim 2, wherein the bolt is a screw which is screwed into the plate.

5. The steering wheel according to claim 1, wherein the steering wheel has two of said travel limiting members.

6. The steering wheel according to claim 2, further comprising a rotation-preventing element preventing rotation of said plate relative to said steering wheel hollow, and wherein said plate is guided in said steering wheel hollow by said rotation-preventing element, and the bolt has a clearance in the recess in the base, said clearance remaining after maximum rotation play of the plate with respect to the base.

7. The steering wheel according to claim 1, wherein each of said spokes, on a side facing the steering column, has a web directed toward a side of the steering column and extending against an outer casing surface of the casing, and wherein, in a region of each of said webs, said casing of said steering wheel hollow and said webs are provided with a respective predetermined breaking region.

8. The steering wheel according to claim 7, wherein the webs extend in the axial direction of the steering wheel hollow overlapping said plate in the rest position.

9. The steering wheel according to claim 6, wherein said rotation-preventing element comprises said steering wheel hollow having at least one rotation-preventing recess into which said plate is slidably and non-rotatably disposed.

10. The steering wheel according to claim 9, wherein there are two of said rotation-preventing recesses which are radially aligned.

11. The steering wheel according to claim 1, wherein said end regions are pivotal into said space in said released position and load occurrence.

12. The steering wheel according to claim 1, wherein said end regions at a connection of said spokes and said casing are breakable.

13. The steering wheel according to claim 1, wherein said end regions are formed with predetermined breaking regions, said plate while in the rest position is adjacent to and providing support for said predetermined breaking regions, whereby said predetermined breaking regions are supported against breaking when said plate is in the rest position.

14. The steering wheel according to claim 13, wherein said breaking regions are recesses on said casing at said connection.

15. A steering wheel for a vehicle adapted to be connected to a steering column, said steering wheel comprising:

a steering wheel hollow having a casing adapted to be connected to said steering column;

an airbag disposed in said steering wheel hollow, said airbag inflating in event of a vehicle impact;

a steering wheel rim, with respect to the steering wheel hollow, being offset axially toward a position of a driver;

spokes connected between said casing and said steering wheel rim, said spokes having end regions remote from said rim, said end regions being connected adjacent end regions of said casing;

said casing defining a predetermined compartment space adjacent said end regions predetermined to receive said regions upon the vehicle impact, wherein with the airbag inflated in a released position, said end regions of the spokes and of the casing break off from said casing, said end regions of said spokes and said casing being formed such that upon breaking the end regions of the spokes and of the casing enter said predetermined compartment space, whereby the steering wheel is collapsable and said end regions of the spokes and of the casing enter into said compartment space.

16. The steering wheel according to claim 7, wherein said webs enlarge in direction toward said breaking regions at the end regions at the outer casing surface and are axially connected to said casing thereof along a length of said casing substantially equal to the axial length of said space.

* * * * *